March 5, 1963 W. F. ALLER ETAL 3,079,678
ASSEMBLY APPARATUS
Filed Dec. 14, 1956 5 Sheets-Sheet 1
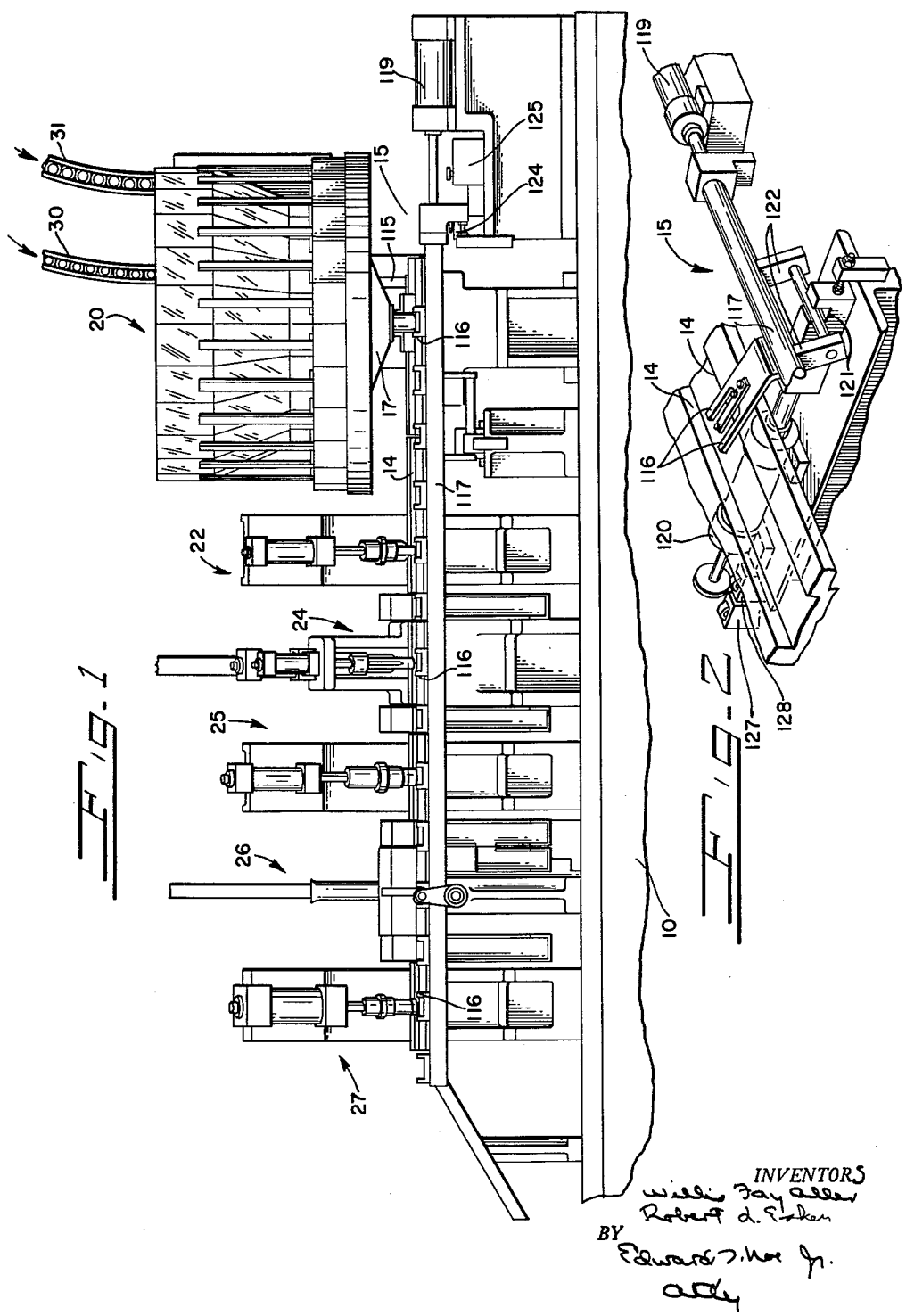
INVENTORS
Willis Fay Aller
Robert L. Erken
BY Edward T. Nor Jr.
atty March 5, 1963 W. F. ALLER ETAL 3,079,678
ASSEMBLY APPARATUS
Filed Dec. 14, 1956 5 Sheets-Sheet 2
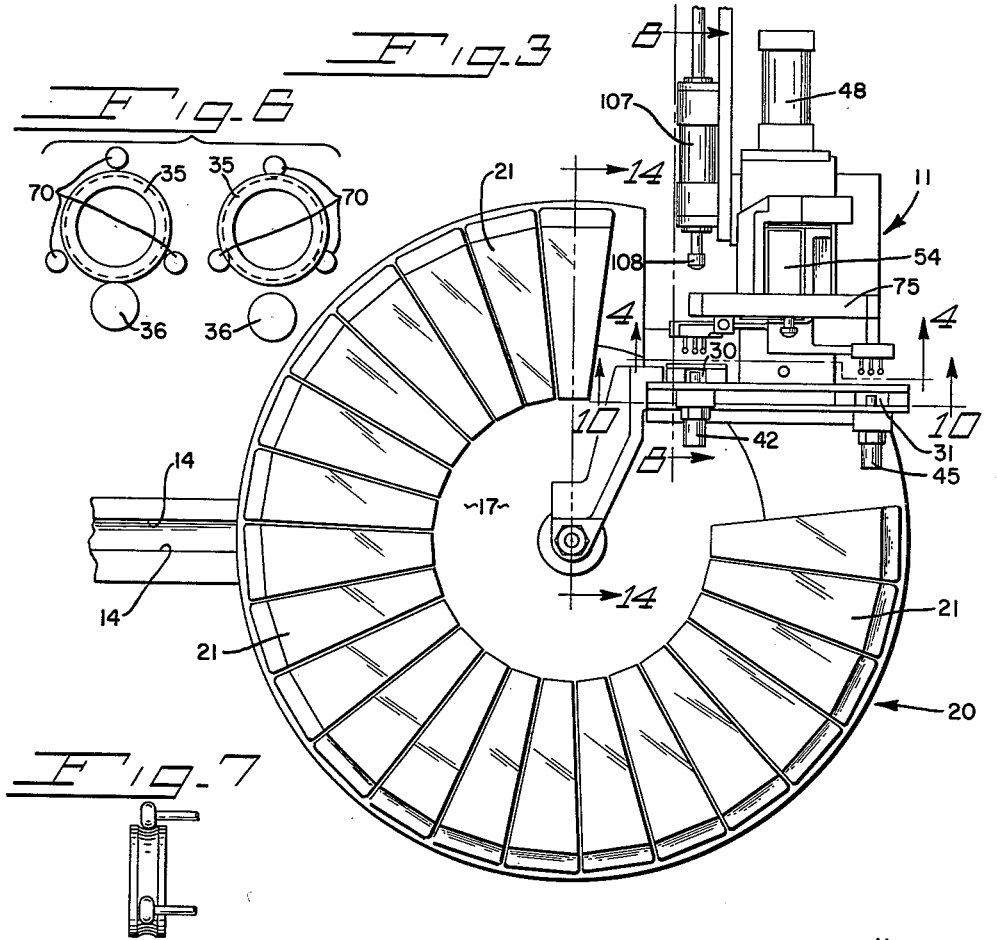
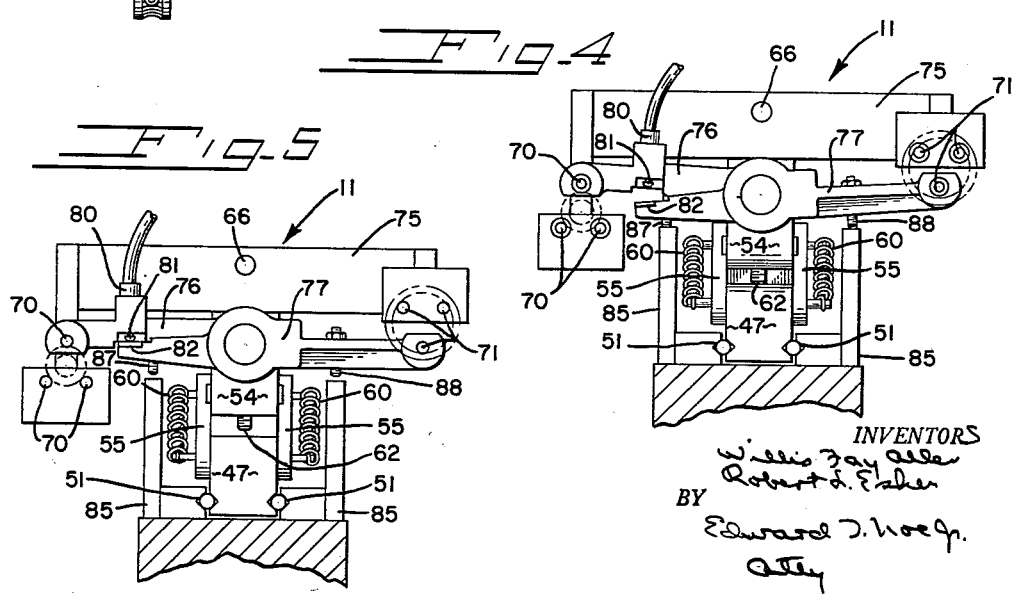
INVENTORS
Willis Jay Aller
Robert A. Fisher
BY Edward J. Hoegy
Alley

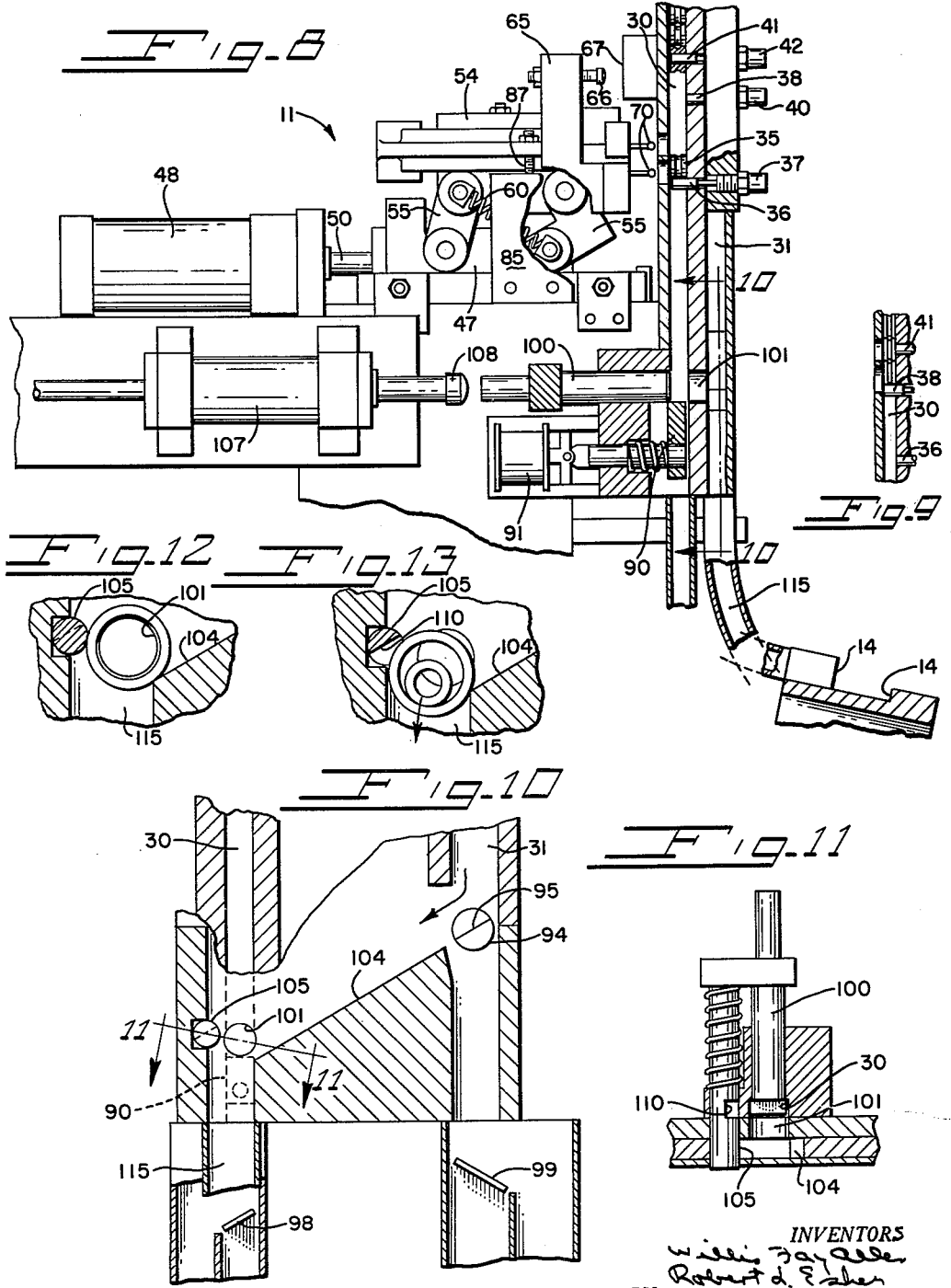

March 5, 1963 W. F. ALLER ETAL 3,079,678
ASSEMBLY APPARATUS
Filed Dec. 14, 1956 5 Sheets-Sheet 4
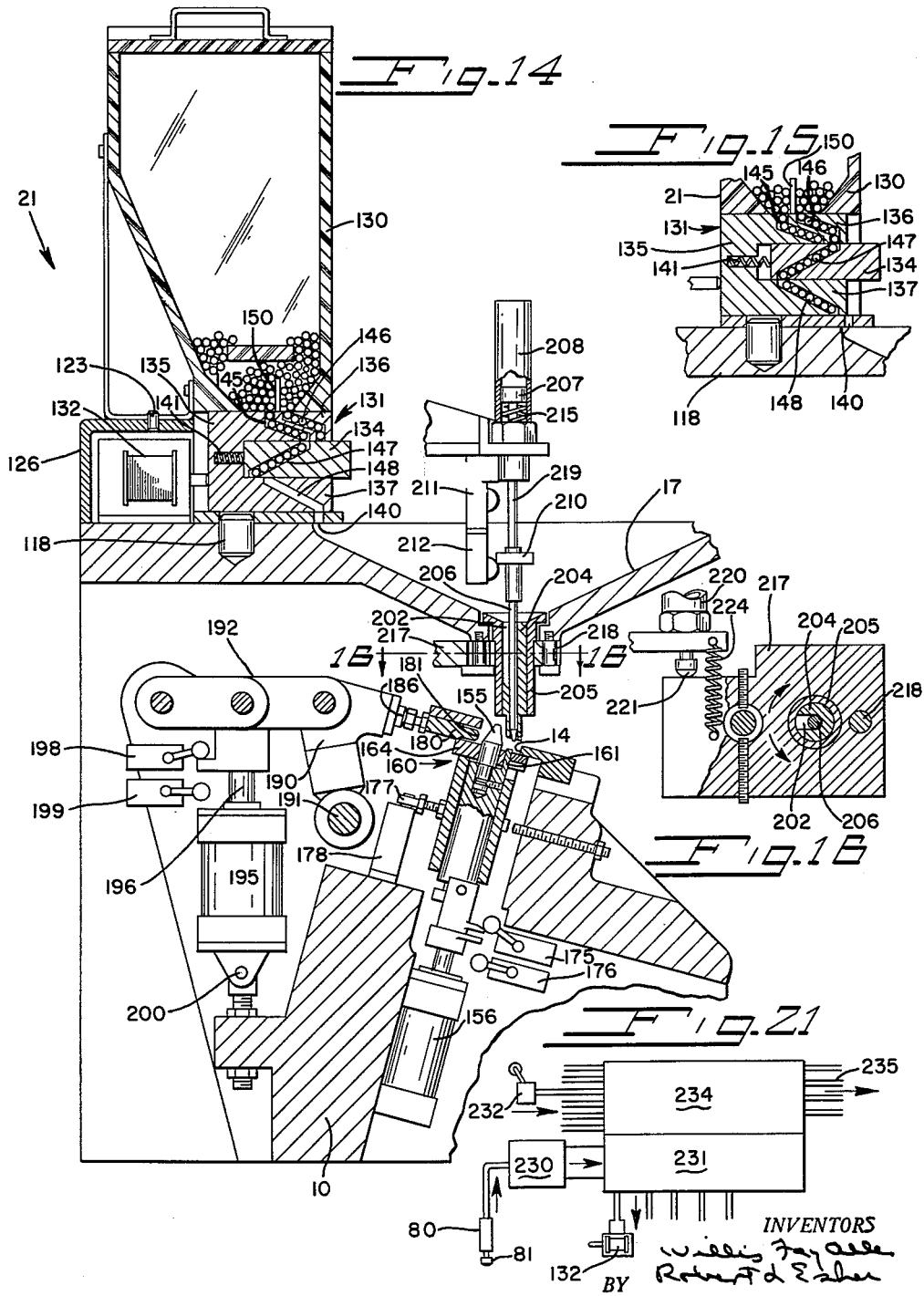

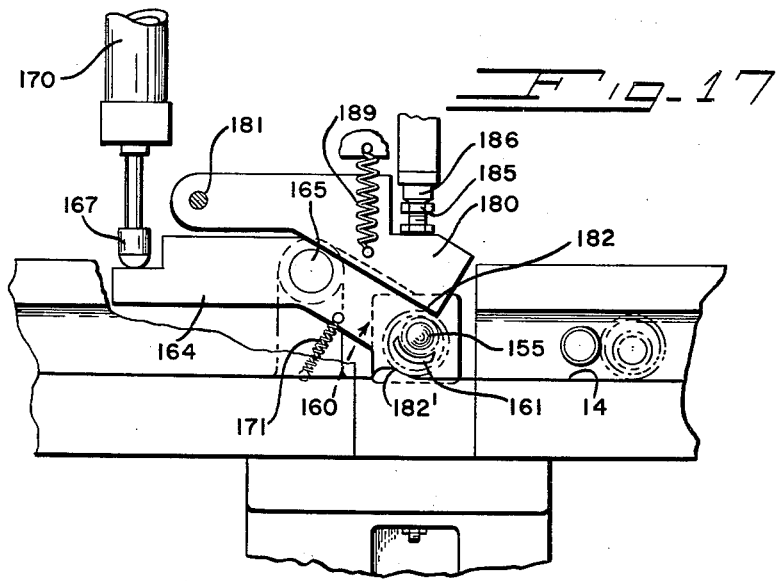
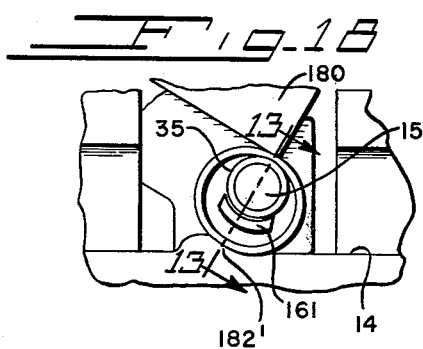
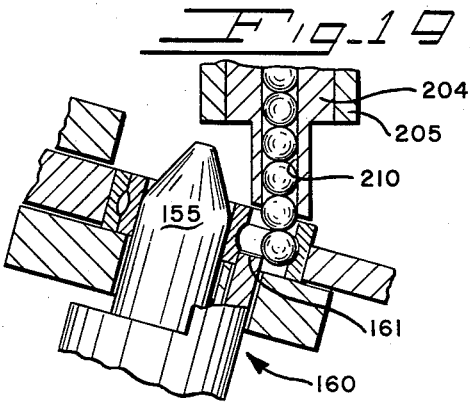
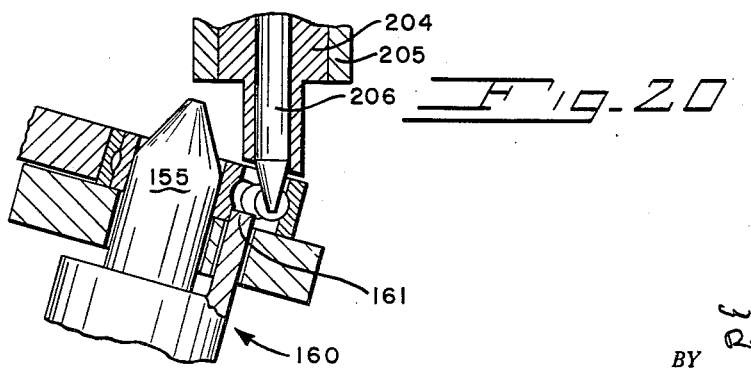

United States Patent Office 3,079,678
Patented Mar. 5, 1963

3,079,678
ASSEMBLY APPARATUS
Willis Fay Aller, Dayton, and Robert L. Esken, Clayton, Ohio, assignors to The Sheffield Corporation, Dayton, Ohio, a corporation of Delaware
Filed Dec. 14, 1956, Ser. No. 628,468
7 Claims. (Cl. 29—201)

This invention relates to gaging and assembly apparatus and more particularly to an apparatus for automatically gaging, selecting and assembling bearing components.

It is an object of this invention to provide an apparatus for accurately gaging, handling and assembling in a rapid and efficient manner cooperating parts such as cooperating components of a ball bearing.

It is a further object to provide gaging apparatus for simultaneously matching or comparing raceway dimensions or the like on a pair of cooperating parts, the apparatus including locating means and gaging contacts for each part uniquely actuated to automatically gage the cooperating dimensions of the parts and to clear and release the parts after gaging.

It is a further object to provide automatic handling apparatus for difficult to handle parts such as bearing components for automatically performing in a simple and reliable manner such operations as placing an inner bearing ring within an outer and the automatic relative displacement and distortion of bearing rings for the loading of balls therebetween.

It is a further object to provide an apparatus for automatically supplying a predetermined number of similar parts selected from one of a plurality of supplies available in different size ranges for assembly with previously gaged components, wherein each supply means includes unique reservoir and part metering means.

It is a further object to provide such an apparatus wherein a common, substantially dish shaped receiver is provided having selectively operable supply means spaced about its periphery for loading parts thereinto by gravity, and assembly means in operative connection wtih said receiver.

Other objects and advantages of the invention will be apparent from the following description, the appending claims and the accompanying drawings, in which, FIGURE 1 is a front view in elevation of an automatic bearing assembly machine embodying the present invention, FIGURE 2 is a fragmentary perspective view of the machine of FIGURE 1 showing a portion of the transfer apparatus involved in its operation, FIGURE 3 is a plan view of the right hand portion of the machine of FIGURE 1 showing the gaging and selecting structure, FIGURE 4 is a view on line 4—4 of FIGURE 3 illustrating the forward face of the gaging apparatus as it appears in retracted position, FIGURE 5 is a view similar to that of FIGURE 4 with the gaging apparatus in gaging position, FIGURE 6 is a diagrammatic illustration of the association of the gaging contacts with an inner bearing ring prior to gaging and during gaging, FIGURE 7 is a side view of an inner ring with the gage contacts in engagement therewith, FIGURE 8 is a sectional view on line 8—8 of FIGURE 3 illustrating primarily the gaging apparatus and associated part handling structure, FIGURE 9 illustrates a portion of the section of FIGURE 8 with the escapement structure for the inner bearing rings in a different position, FIGURE 10 is a sectional view taken on line 10—10 of FIGURE 8 showing the chute and part handling arrangement for receiving parts after gaging, FIGURE 11 is a section on line 11—11 of FIGURE 10 illustrating the mechanism for placing the gaged inner ring within the outer, FIGURES 12 and 13 illustrate steps in the above operation, FIGURE 14 is a sectional view taken on line 14—14 of FIGURE 3 showing one of the ball supply units and the major portion of the structure for assembling selected balls with previously gaged inner and outer bearing rings, FIGURE 15 is a fragment of the section of FIGURE 14 showing the structure for metering a predetermined number of balls in a second position, FIGURE 16 is a sectional view on line 16—16 of the FIGURE 14 illustrating a portion of the ball assembly structure, FIGURES 17 and 18 illustrate further portions of the ball assembly structure, FIGURES 19 and 20 illustrate enlarged portions of the section of FIGURE 14 to show the ball loading operation, and FIGURE 21 is a diagramatic showing of an exemplary electrical circuit for the apparatus.

The exemplary machine illustrated in FIGURE 1 is provided for the gaging and assembly of cooperating components of a single row ball bearing.

It will be understood that while the present invention is particularly illustrated and described as applied to such an operation, it can be embodied in materially different structural arrangements and applied to other parts.

The comprehensive machine comprises a base 10 which supports the various machine components. Inner and outer bearing rings are supplied to a gaging station 11 which compares the dimensions of their cooperating raceways in order to determine from which one of a number of available supplies of balls segregated in different size ranges balls should be selected for assembly therewith. Following the gaging or comparing operation, the inner ring is placed wtihin the outer and the assembly moves by gravity to a position between the guides 14 of a transfer arrangement extending through the machine. Transfer mechanism 15 then positions the inner and outer ring set below the dish-shaped receiver 17 of a ball assembly station 20.

Balls selected from one of a number of supply units 21 spaced about receiver 17 are then automatically loaded between the inner and outer rings. The present invention particularly pertains to the structure broadly described above.

Following the above operations the assembled components are sequentially stepped by transfer 15 through the stations of the machine from right to left, as illustrated in FIGURE 1. At location 22 the number of balls between the inner and outer rings is automatically checked. If this condition is satisfactory, the apparatus at the station indicated at 24 automatically orients the balls and places the lower separator or cage in association therewith. The station indicated at 25 checks the end play of the bearing and at 26 the opposing separator is placed in position over the balls and between the rings. Finally, the separators are crimped together by the apparatus indicated at 27 and the completely assembled bearing is ejected from the machine.

Inner and outer bearing rings are supplied to the machine through chutes 30 and 31 respectively. The rings within each of these chutes are in random size assortment. Chutes 30 and 31 continue down the forward face and below gaging apparatus 11 and each includes escapement structure to position the rings for gaging. FIGURES 8 and 9 illustrate the operation of the escapement mechanism for chute 30 which contains the inner rings. In FIGURE 8 an inner ring 35 is located in gaging position within chute 30 by an extended plunger 36 actuated by air cylinder 37. A second plunger 38 associated with cylinder 40 is retracted and the upper stack of inner rings is held against movement down the chute by escapement plunger 41 actuated by air cylinder 42. Following gaging plunger 38 is extended and plungers 36 and 41 retract (as seen in FIGURE 9) to release the previously gaged inner ring and drop the stack into position for loading another race into gaging position when the plunger positions are reversed. Similarly, escapement plungers are actuated in chute 31 for locating an outer ring within its respective chute in association with gaging apparatus 11. One of the air cylinders associated with the escapement operation for chute 31 is indicated at 45 in FIGURE 3.

The gaging apparatus proper is shown most clearly in FIGURES 3 to 8. A lower slide 47 actuated by cylinder 48 and connecting rod 50 is movable toward and from supply chutes 30 and 31 along ball ways 51. Slide 47 is in its retracted position in FIGURE 8. An upper body 54 is supported from slide 47 by links 55. Springs 60 act between a pair of the links on each side of slide 47 to bias body 54 forward and downward to a position limited by engagement of screw 62 with the upper surface of slide 47 (see FIGURE 4). Thus in its retracted position body 54 is lowered. An upper arm 65 connected to body 54 supports a button 66 engageable with a fixed stop surface 67. Cylinder 48 is energized to move slide 47 forward toward gaging position. At a predetermined forward position of the assembly button 66 engages stop surface 67 and links 55 rock upwardly as slide 47 continues its forward movement to elevate body 54.

Gaging contacts sets are provided for association with each of the bearing rings. Contacts 70 are provided for engagement with the inner raceway and contacts 71 engage the outer raceway. The lower pair of contacts 70 and the upper pair of contacts 71 are fixedly supported on body 54 by beam 75 so they move up and down therewith. A pair of gaging arms 76 and 77 are coaxially pivoted at the forward face of upper body 54. They respectively carry gaging contacts 70 and 71 at their outer ends.

Gaging means cooperate between the arms. As shown arm 76 carries a gaging cartridge 80 having a movable contractor 81 in opposition to a surface 82 at one end of arm 77. Cartridge 80 can be of any available type but, as illustrated and employed in this exemplary apparatus, it is of a construction shown in detail in Patent No. 2,833,046 issued May 6, 1958, wherein contactor 81 positions a movable core within the windings of a differential transformer to provide a voltage signal in accordance with the contactor position and the relative positions of arms 76 and 77.

Locator blocks 85 at each side of slide 47 provide fixed horizontal upper surfaces in opposition to stop screws 87 and 88 on arms 76 and 77 respectively. When slide 47 is retracted and body 54 is lowered, arms 76 and 77 are rocked upwardly as seen in FIGURE 4 by engagement of screws 87 and 88 with these surfaces.

When slide 47 is moved from its retracted to its forward position, gaging contact sets 70 and 71 are carried through holes provided in the adjacent walls of supply chutes 30 and 31 and into the planes of the respective raceways. At this point button 66 engages stop surface 67. As slide 47 continues its forward movement body 54 raises and the contacts 70 and 71 associated with the downwardly facing raceway surfaces are carried upward to lift the rings from the respective escapement plungers (see the righthand portion of FIGURE 6). The opposing contacts on 76 and 77 then engage the raceways and are positioned thereby as seen in FIGURE 5. Thus, the gaging contacts at the outer ends of the gaging arms are relatively positioned in accordance with the relative diameters of the engaged raceways and a voltage signal is provided by cartridge 80, indicative of the relative diameters and the size balls needed for assembly therewith to properly fill the space between the raceways.

After the dimensional relationship between the raceways of a cooperating set of rings has been gaged, the escapement plungers are actuated as previously described and the parts continue their movement by gravity down chutes 30 and 31. It will be seen from FIGURES 3 and 8 particularly that chutes 30 and 31 are not in the same plane. A stop member 90 located in chute 30 is actuated by solenoid 91. A plunger 94 in vertical alignment with chute 31 has a diverting land 95 and is similarly actuated by a solenoid, not illustrated. If the gaging results indicate that the gaged pair of rings cannot be properly assembled with any of the available ball sizes, plunger 94 and stop member 90 are retracted and the rings continue their movement downward as rejects.

Segregating gates 98 and 99 vertically below chutes 30 and 31 respectively, can be simultaneously projected into the paths of the rings to divert them or retracted to allow movement straight down to segregate the rejected rings to one side or the other into receiving chutes. If, for example, too little space is available between the rings for the smallest size ball available gates 98 and 99 can be projected to divert the rings. If too much space is available for even the largest available size balls the gates can be retracted. Later these rejected and segregated rings can be fed back into the machine and the likelihood of obtaining properly matched rings is increased. For example, inner rings which previously provided too little space are fed into association with outer rings which provided too much space.

If an acceptable match is obtained the inner race is located by the upper surface of member 90 in alignment with a plunger 100 and an opening 101 which will permit passage of the inner ring between the chutes but not the outer. The outer ring is diverted by surface 95 on plunger 94 and moves along incline 104 until it is stopped by engagement with a locating plunger 105. This relationship is shown in FIGURE 12. Thus the inner and outer rings are positioned in coaxial alignment but in their respective chutes. Energization of cylinder 107 and projection of abutment 108 extends plungers 100 and 105 forward against the resistance of spring 107. Plunger 105 includes a releasing slot 110 which, when the plunger is in its retracted position, is in the plane of chute 30. As plungers 100 and 105 advance, plunger 100 engages the adjacent end face of the inner ring and moves it through opening 101 to a position within the outer ring. Simultaneously, release slot 110 arrives in the plane of the outer bearing ring (note FIGURE 13) and the components, one within the other, are released for further downward movement into a chute 115, as seen in FIGURE 13 and the inner and outer ring assembly moves by gravity to a position between tracks 14 and into association with the transfer mechanism for movement to the subsequent stations.

FIGURE 2 illustrates an exemplary transfer mechanism which can be used with the present apparatus. Feed fingers 116 provided for engagement with opposite sides of an outer ring are fixed to a transfer bar 117. Bar 117 is reciprocated endwise by cylinder 119 for transfer and return and is rocked to raise and lower fingers 116 by cylinder 120, yoke 121 and arms 122. Switch units 124 and 125 signal the forward and return positions of the feed fingers respectively. Units 127 and 128 respectively signal the raised and lowered finger positions. This transfer is actuated in a known manner to sequentially step the bearing components through the stations of the machine.

As previously stated, a number of supply units 21 (21 units in the illustrated embodiment) are spaced about the periphery of a substantially dish shaped receiver 17. Each of the supply units 21 is simply mounted by engagement with a pin 118 fixed relative to receiver 17 and a pin 123 in solenoid housing 126. Each unit 21 includes an upper reservoir 130 which contains a supply of bearing balls having diameters lying within a given size range. The size ranges for each of the units 21 is different from that of the others so that a full set of balls can be selected in accordance with the previous gaging operation with assurance that the selected balls will properly interfit and cooperate between the gaged or matched inner and outer rings within the required tolerances.

A metering unit 131 below each of the reservoirs 130 is actuated by a solenoid 132 to release a predetermined number of balls of the selected size range into receiver 17. As illustrated the metering system includes a central block 134. A slidable block 135 actuated by the respective solenoid 132 includes an upper portion 136 and a lower portion 137 at each side of block 134. Metering passages provided in the respective portions of block 135 and in block 134 are placed in and out of registry with each other upon movement of slidable block 135. A fixed outlet opening 140 is provided directly above the periphery of receiver 17.

When solenoid 132 is de-energized, block 135 is held in a rearward position by spring 141 and the passages are in the relative depositions illustrated in FIGURE 15. Upper metering passages 145 and 146 receive balls directly from reservoir 130. Passage 146 is in communication with passage 147 in central block 144 and with lower metering passage 148. Passage 148 has a predetermined length to receive a given number of bearing balls.

Upon energization of the solenoid slidable block 135 is moved forward to a position as seen in FIGURE 14 and lower passage 148 empties into receiver 17 through opening 140. To insure that the central passage 147 is completely filled with balls it is then placed in communication with passage 145. An agitator 150 moves with block 135 to free the balls within the reservoir and insure that the passages of the metering unit are completely filled. Through the positioning of supply units 21 about the periphery of receiver 17 complicated feeding structure for the large number of ball sizes ordinarily necessary is eliminated.

Transfer 15 moves the gaged pair of rings to a position just below and slightly eccentric to the lower portion of receiver 17. A plug 155, having a conical upper end and forming a part of an assembly 160, is projected upwardly by means of a cylinder 156. Plug 155 is so conformed as to enter the inner bore of the inner ring. The assembly 160 actuated by cylinder 156 includes a half-moon shaped projection 161 for cooperating with the balls as later described. Assembly 160, including plug 155, is mounted at one end of an arm 164 pivoted at 165 as seen in FIGURE 17 and actuated by an abutment 167 moved by an air cylinder 170. When abutment 167 is projected, arm 164 rotates in a counterclockwise direction as seen in FIGURE 17 and plug 155 moves the inner race to a position eccentric within the outer, as seen in FIGURE 18. A spring 171 seen in FIGURE 17 maintains the opposing end of arm 164 against abutment 167.

Limit switch units 175 and 176 signal the projected and retracted positions of plug 155 and roller 177 of switch unit 178 is actuated when the block is swung to carry the inner ring off center.

In order that a sufficient number of balls can be freely placed within the inner and outer rings, prior to movement of the inner ring to an eccentric position, the outer ring is forced into an oval configuration shown exaggerated in FIGURE 18. A force applying arm 180 pivoted at 181 provides a force supplying surface at 182 to engage the outer surface of the outer ring at a point dimetrically opposite an opposing surface 182' on track 14. Arm 180 has an actuating stop 185 maintained in engagement with an actuating abutment 186 by spring 189.

Abutment 186 is supported on an arm 190 pivoted at 191 and rocked through a toggle assembly 192 by cylinder 195. Thus, when rod 196 is projected upwardly, force applying surface 181 of arm 180 compresses the outer ring into an oval configuration through its cooperation with surface 182. With the inner ring located eccentrically, sufficient space is provided for loading of the balls. Switch units 198 and 199 respectively signal that the force is being applied and released. Cylinder 195 is pivotally attached at 200 to the base 10 of the machine.

Balls released from the selected one of supply units 21 roll down the surface of receiver 17 and into a vertical groove 202 of a loading mechanism associated with the receiver. Groove 202 is provided by a sleeve 204 fixed within a loading carrier 205. A loading plunger 206 having a tapered lower end is advanced and retracted by piston 207 within air cylinder 208.

A flange 210 fixed to plunger 206 actuates switch units 211 and 212 at its upper and lower limits respectively. In the position of plunger 206 as seen in FIGURE 14, the balls are prevented from leaving the receiver 17. After the outer ring has been squeezed to an oval shape, and the inner ring has been swung eccentrically by plug 155 plunger 206 is retracted and the balls flow freely from groove 202 and through passage 210 at the lower end of sleeve 204 directly below plug 155 into the space provided between the inner and outer rings. Surface 161 at the upper end of assembly 160 prevents the balls from dropping below the plane of the bearing raceways (see FIGURE 19). After the balls have been fed by gravity between the inner and outer rings pressure is supplied to the upper end of cylinder 208 and plunger 206 is extended to a position as indicated in FIGURE 20 to apply pressure to the balls and, if necessary, force them into position. After the force has been applied if plunger 206 fully extends all pressure is relieved from the plunger actuating cylinder 208 and spring 215 returns the plunger to the position in FIGURE 14 which is adjacent the lower stroke limit.

If, for example, jamming should occur as by two balls being in perfect alignment with one another and with plunger 206, the plunger cannot complete its full downward stroke. Referring to FIGURES 14 and 16, it would be seen that the components of the loading assembly, including plunger 206, are carried by a plate 217 pivotally supported by a pin 218. Air cylinder 220 is provided to extend plunger 221 and swing plate 217 through a small movement against the tension of spring 224 to shift the position of plunger 206. Connecting rod 219 extending from piston 207 is flexible enough to accommodate this movement. Thus, if the plunger does not move down to its full extent, after a preset length of time it is automatically swung or shifted and pressure is again applied. In one commercial application this shift is automatically repeated in sequence as necessary in order to clear any possible jamming and assure that the balls are all properly positioned. If, after a predetermined number of shifts of plunger 206 the plunger still cannot fully extend, the machine is automatically stopped.

After the balls are loaded between the eccentrically arranged inner and outer rings, block 155 is then swung back to its original position, snapping the inner ring into substantially concentric relationship with the outer. The force of abutment 186 against force applying arm 180 is relieved and the outer ring once more assumes its circular shape. Following this, the assembled components are transferred to a subsequent station.

In operation the machine receives inner and outer bearing rings supplied through chutes 30 and 31. The rings are positioned for gaging by escapement plungers such as those indicated at 36, 38, and 41 for chute 30. Gaging slide 47 is then moved forwardly by cylinder 48 and contact sets 70 and 71 are carried through holes in the chutes and into the planes of the respective raceways. When this occurs, button 66 strikes stop surface 67 and upper body 54 is moved upward to move the gaging contacts into positioning engagement with the bearing raceways, as previously described. Gaging cartridge 80 provides a voltage signal determined by the relative dimensions of the raceways. If the rings are of such dimension that they cannot be assembled by any of the available ball sources, they are rejected and segregated by gates 98 and 99. However, if an acceptable pair has been processed, the inner ring is placed within the outer upon forward extension of plunger 100 and the rings are released for further movement when release slot 110 of plunger 107 arrives in the plane of the outer bearing ring.

The rings are then moved by transfer mechanism 15 to a position beneath substantially dish shaped receiver. One of the metering units 131 is actuated in response to the gaging by its associated solenoid 132 to release a predetermined number of bearing balls within a desired size range into receiver 17. Arm 180 is rocked to force surface 181 into engagement with one side of the ring, and, in cooperation with opposed surface 182, forces the outer ring into an oval configuration. Plug 155 is then projected into the bore of the inner ring and swung into an eccentric position as seen in FIGURE 18.

Plunger 206 is then retracted by cylinder 208 to allow the balls to flow by gravity into the space between the inner and outer rings. Air is applied to the upper end of cylinder 208 to force plunger 206 full down and insure that the balls are fully received. If plunger 206 cannot be fully extended because of jamming, air cylinder 220 is energized to swing plate 217 and plunger 206 to one side and the extension pressure is then applied. This sequence can be repeated as desired and terminated by stopping the machine after a predetermined number of attempts.

After the balls have been loaded into position, plug 155 is swung back into its original position and retracted and the force applied by surface 181 is removed so that the outer ring assumes its original configuration.

FIGURE 21 is a diagram of an electric control system. Voltage signals from cartridge 80 are fed to an electronic gaging system 230 which can be of a character described in application No. 501,602, filed April 15, 1955. Signals thus provided are fed to a suitable electrical classification system. A system such as disclosed in co-pending application 539,484, filed October 10, 1955 could be used. In that system input voltage signals are applied to actuate a stepping switch to apply sequentially increasing voltages in opposition to a voltage function of the input voltage. The stepping switch stops when an opposing voltage is reached at least equal to the predetermined function of the input voltage and a second bank of contacts in the stepping switch provides predetermined electrical connections depending upon which step the switch stops at. Thus a signal is provided for energization of the proper ball selecting solenoid 132 in response to the relative dimensions of the raceways. Signals of various machine actuations and positions are provided by limit switches such as that indicated at 232 and a suitable sequencing electrical circuit 234 is provided to give output signals 235 to control the cycle, as by actuation of the various air cylinders and solenoids disclosed.

Thus it is seen that an apparatus has been provided for the rapid and efficient gaging in an automatic manner of parts ordinarily difficult to handle. Transfer mechanism of a unique and advantageous construction is provided and assembly structure is utilized for carrying out difficult operations in a reliable and simple manner.

While the form of apparatus herein described constitutes a preferred embodiment of the invention, it is to be understood that the invention is not limited to this precise form of apparaus and that changes may be made therein without departing from the scope of the invention which is defined in the appended claims.

What is claimed is:

1. Apparatus for automatically gaging and assembling cooperating parts such as antifriction elements between inner and outer bearing rings comprising, gaging means for comparing the cooperating dimensions of a pair of inner and outer bearing raceways and providing a signal determined by the space therebetween, a plurality of supply means each containing a different size range of antifriction elements for assembly with said rings, a common receiver in operative association with all said supply means for receiving antifriction elements selectively metered from any one of said supply means, metering means for each of said supply means responsive to said gaging means for automatically loading a predetermined number of antifriction elements from a selected one of said supply means determined by said gaging signal into said common receiver in accordance with the relative dimensions of the gaged pair of raceways, said receiver receiving antifriction elements from a plurality of sources provided by said supply means and having a single outlet for said elements, and assembly means cooperating with the outlet of said common receiver for assembling the selected antifriction elements supplied therethrough with the gaged rings.

2. Apparatus for automatically gaging and assembling cooperating parts such as antifriction elements between inner and outer bearing rings comprising, gaging means for comparing the cooperating dimensions of a pair of inner and outer bearing raceways and providing a signal determined by the space therebetween, a plurality of supply means, each for containing a different size range of antifriction elements for assembly with said rings, a substantially dish shaped receiver cooperating with all said supply means for receiving antifriction elements selectively metered from any one of said supply means thereinto, means supporting said supply means in relatively spaced relationship about the periphery of said receiver for selective automatic loading of antifriction elements from the supply means into the receiver, metering means for each of said supply means responsive to the signal provided by said gaging means for automatically feeding a predetermined number of antifriction elements from a selected supply means and into said receiver in accordance with the relative dimensions of the gaged raceways said receiver having a single outlet, and assembly means cooperating with the outlet of said receiver for assembling the selected antifriction elements supplied therethrough with the gaged raceways.

3. Apparatus for automatically gaging and assembling cooperating parts comprising a base, means on said base for locating a pair of parts in position for gaging, gaging contacts for simultaneous engagement with cooperating surfaces on the parts, carrying means on said base for said gaging contacts, said carrying and locating means being relatively movable to position the gaging contacts in opposition to the surfaces to be gaged, said carrying means including actuating means for automatically moving said contacts into positioning engagement with the respective surfaces of parts supported by said locating means, gaging means responsive to the relative positions of the gaging contacts and providing a signal determined by the relationship between the gaged dimensions, a plurality of supply means on said base each containing a different size range of elements for cooperation between said parts, a receiver in operative association with all said supply means, metering means for each of said supply means automatically responsive to said gaging means and the signal provided thereby for loading a predetermined number of antifriction elements from the one of said supply means determined by said gaging signal into said receiver in accordance with the relative dimensions of the gaged pair of parts, said receiver having a single outlet and assembly means cooperating with the outlet of said receiver for assembling the selected elements metered into the receiver with the gaged parts.

4. Apparatus for automatically assembling bearing balls with inner and outer bearing rings comprising a base, gaging means on said base for receiving an inner and an outer bearing ring including gaging contacts for positioning engagement therewith to compare the raceway dimensions, handling means for receiving a gaged pair of rings and placing the rings one within the other in a partial assembly, a plurality of supply means on said base, each for containing a quantity of bearing balls of a size range differing from the others, each of said supply means including a reservoir and relatively shiftable units having metering passages for supplying a predetermined number of balls of the selected size range, control means responsive to said gaging means for automatically actuating a selected one of said supply means in accordance with the relative dimensions of the gaged raceways, a common receiver for said supply means having a single outlet, assembly means for receiving and placing said partial assembly, below said receiver and cooperating with said single outlet, said assembly means including force applying contacts for application to deform the outer ring and a plunger to engage and place the cooperating inner ring eccentric relative thereto, a loading plunger in said receiver for retraction to release selected balls from said receiver into the space between the deformed outer ring and eccentric inner ring and extention to force said selected balls into position, carrier means supporting said loading plunger for lateral shifting and extention in case of jamming, and power and control means connected for automatic movement of the operating components of the apparatus in a sequential operating cycle.

5. Apparatus for assembling bearing balls with inner and outer bearing rings comprising a base, chutes on said base for receiving inner and outer bearing rings of random size, escapement means in said chutes for locating an inner and an outer bearing ring in positions for gaging, gaging contacts for simultaneous engagement with the raceways of the rings, carrying means operative to move said contacts from a retracted position forward into said chutes and into the planes of the respective raceways, said carrying means including actuating means for then placing the contacts in positioning engagement with the raceways, gaging means responsive to the relative positions of the gaging contacts and the relative diameters of the raceways, locating means in said chutes below said gaging contacts for locating a gaged pair of rings in coaxial relationship within the respective chutes following gaging, plunger means on said base for moving the gaged inner ring to a position within the outer in a particular assembly and releasing the assembly, a plurality of supply means each containing a different size range of bearing balls, each supply means including a reservoir and relatively shiftable metering units in association therewith having cooperating metering passages, said passages including a control passage of predetermined size to receive a given number of balls, actuating means associated with said units for loading said control passage to capacity with balls from said reservoir and then releasing the balls therefrom, control means responsive to said gaging means for automatically moving said actuating means to release a predetermined number of balls of a selected size range determined by the relative diameters of the gaged raceways, a common receiver for said supply means, assembly means below said receiver for receiving the partially assembled inner and outer rings from said locating means and said chutes including means for forcing the outer ring to an oval configuration and including a plunger carried for insertion into the inner ring and lateral movement to carry the inner ring eccentric within the outer, said receiver having an opening, a loading plunger on said base movable in said opening for retraction to release selected balls from said receiver into the space between the deformed outer and eccentric inner rings and movement to a first forward position for ball retention and to a second forward position for force application to the balls, and power and control means connected for automatic movement of the operating components of the apparatus in a sequential operating cycle.

6. Apparatus for gaging and assembling inner and outer bearing rings of a bearing assembly comprising a base, chutes on said base for respectively receiving inner and outer bearing rings of random size, escapement means in said chutes for locating an inner and an outer bearing ring in the respective chutes in positions for gaging, first and second relatively movable gaging contact sets for simultaneous engagement with the inner and outer raceways of the rings, carrying means operative to simultaneously move said contact sets from retracted positions forward into the respective chutes and into the planes of the respective raceways, said carrying means including actuating means for then automatically relatively expanding the first contact set into positioning engagement with the inner raceway and relatively contracting the second contact set into engagement with the outer raceway, gaging means responsive to the relative positions of the gaging contacts and the relative diameters of the raceways, assembly means in said chutes below said gaging contacts including means for locating a gaged pair of rings passing therealong after gaging in coaxial relationship within the respective chutes following gaging, and plunger means on said base for moving the gaged inner ring to a position within the outer in a partial assembly and releasing the assembly.

7. An apparatus as set forth in claim 6 wherein said assembly means comprises, means providing an opening between the chutes allowing axial movement of the inner part from its respective chute into the other, a first plunger supported for endwise movement from a retracted position to engage the adjacent face of the inner part and move the part from its respective chute, through said opening, and within the outer part, said locating means including a second plunger for locating engagement with the outer part, said second plunger having a release opening along its length in the plane of the inner part when the plunger is in its retracted position, and actuating means connected to simultaneously advance said plungers from retracted to forward positions to place the inner part within the outer and simultaneously release the assembled parts from their located positions.

References Cited in the file of this patent

UNITED STATES PATENTS

| | | |
|---|---|---|
| 1,274,331 | Rockwell | July 30, 1918 |
| 2,068,683 | Ketcham | Jan. 26, 1937 |
| 2,075,050 | Nowinski | Mar. 30, 1937 |
| 2,222,605 | Carlson | Nov. 11, 1940 |
| 2,235,084 | Ortegren | Mar. 18, 1941 |
| 2,255,626 | Ortegren | Sept. 9, 1941 |
| 2,407,490 | Gregg | Sept. 10, 1946 |
| 2,535,648 | Mills | Dec. 26, 1950 |
| 2,675,621 | Mims | Apr. 20, 1954 |
| 2,686,370 | Walker | Aug. 17, 1954 |
| 2,699,757 | Tornkvist | Jan. 18, 1955 |
| 2,740,382 | Morgan | Apr. 3, 1956 |
| 2,761,560 | Pomernacki | Sept. 4, 1956 |
| 2,767,477 | Esken | Oct. 23, 1956 |
| 2,785,799 | Esken | Mar. 19, 1957 |
| 2,807,973 | Meyer | Oct. 1, 1957 |

FOREIGN PATENTS

| | | |
|---|---|---|
| 758,501 | England | Oct. 3, 1956 |